United States Patent [19]

Mori

[11] 4,426,112
[45] Jan. 17, 1984

[54] SLIDING ROOF FOR VEHICLES

[75] Inventor: Keiji Mori, Toyota, Japan

[73] Assignee: Aisin Seiki Kabushiki Kaisha, Aichi, Japan

[21] Appl. No.: 308,809

[22] Filed: Oct. 5, 1981

[30] Foreign Application Priority Data

Oct. 13, 1980 [JP] Japan .......................... 55-145381[U]

[51] Int. Cl.³ .............................................. B60J 7/04
[52] U.S. Cl. .................................... 296/223; 296/216
[58] Field of Search ............... 296/216, 219, 220, 221, 296/222, 223

[56] References Cited

U.S. PATENT DOCUMENTS 2,968,514  1/1961  Golde ................................. 296/222
3,290,087 12/1966  Werner ............................... 296/223
4,043,590  8/1977  Pizzuti ................................ 296/222

FOREIGN PATENT DOCUMENTS 2508106  9/1975  Fed. Rep. of Germany ...... 296/223

Primary Examiner—Joseph F. Peters, Jr.
Assistant Examiner—Ross Weaver
Attorney, Agent, or Firm—Oblon, Fisher, Spivak, McClelland & Maier

[57] ABSTRACT

A sliding roof includes a vehicle roof having an opening formed therein, a sliding roof mounted on the vehicle for opening or closing the opening of the vehicle roof, a rail member provided on opposite side portions of the opening of the vehicle roof, respectively, a first and second shoe slidably engaged with each of the rail member, respectively, a drive cable mechanism operatively connected to the first and second shoes, and a connecting plate for operatively connecting each of the first and second shoes and the sliding roof so as to form a vertical and width directional clearance therebetween.

7 Claims, 5 Drawing Figures

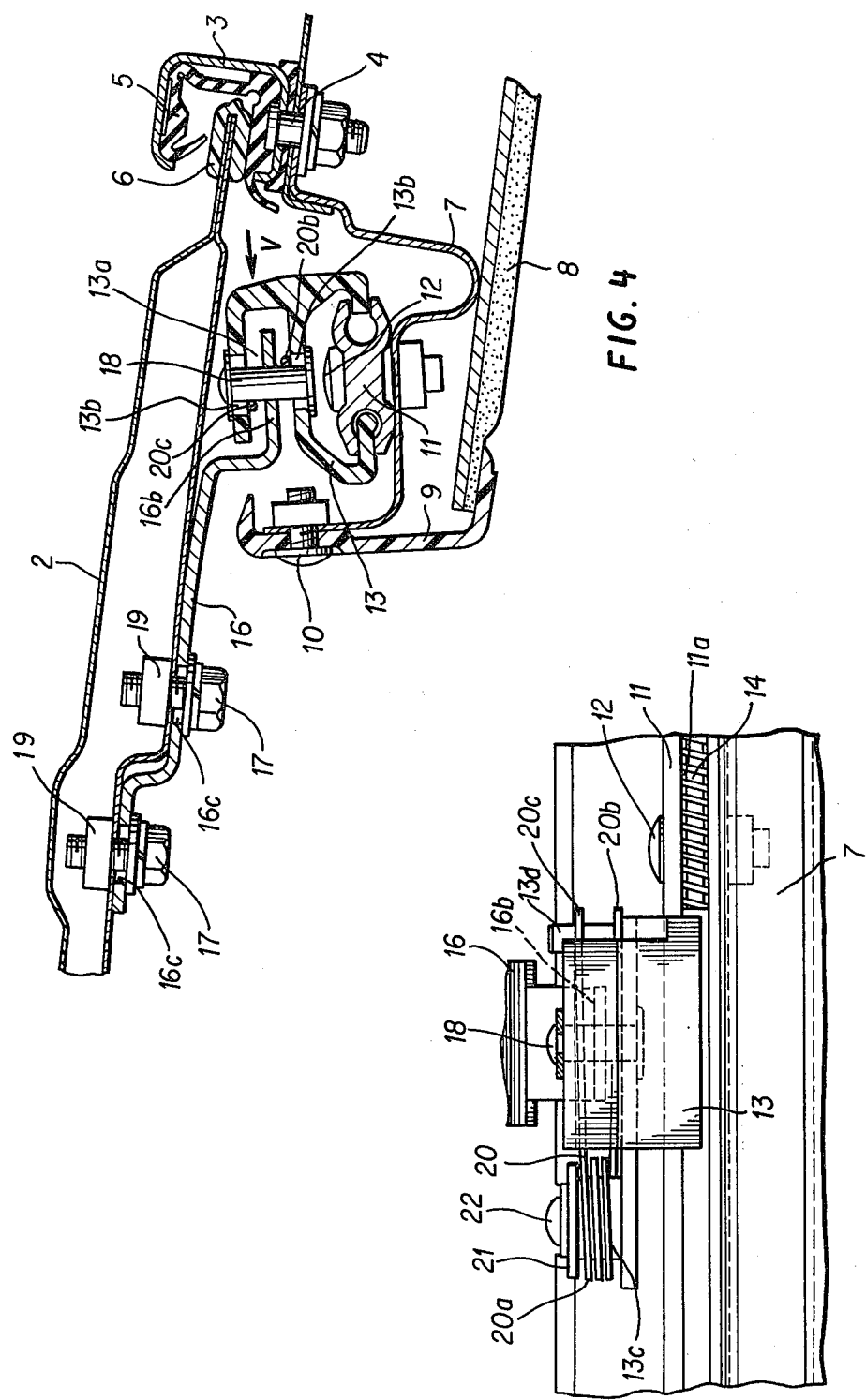

SLIDING ROOF FOR VEHICLES

BACKGROUND OF THE INVENTION

1. Field of the Invention

The present invention relates to a sliding roof, and more particularly to a sliding roof for vehicles.

2. Description of the Prior Art

In a conventional sliding roof for vehicles a shoe connected to a driving cable and a sliding roof are connected to each other by means of a pin almost without provision for any clearance therebetween. If there is no clearance between the shoe and the sliding roof, the cooperation between a shoe rail guiding the shoe and the rail itself becomes loosened and thus not secure. Accordingly, a rail is positioned within a housing through the sliding roof and an inner side of the outer rail and, sliding resistance occurs between the sliding roof and the outer rail by depressing the sliding rail against the outer rail.

Generally, the shoe and the sliding roof are operatively connected by a connecting plate which, in turn, is connected to the shoe by a horizontal pin and to the sliding roof by a bolt, respectively. In this type of sliding roof for vehicles, vertical and transverse clearance is required at a connecting portion between the connecting plate and the shoe so as to connect the shoe and the sliding roof with suitable clearance by a pin. However, provision for a vertical space is required at an upper portion of the shoe for at least vertical clearance, the diameter of the pin, and the thickness of the connecting plate, and the indoor roof must therefor be lowered, thereby reducing the available indoor space.

SUMMARY OF THE INVENTION

An object of the present invention is to provide an improved sliding roof for vehicles which obviates the aforementioned drawbacks of the described conventional sliding roof for vehicles.

A further object of the present invention is to provide an improved sliding roof for vehicles which can be reliably moved and slid.

A still further object of this invention is to provide an improved sliding roof for vehicles which is relatively simple and includes a minimal number of parts.

In accordance with the present invention, a sliding roof is provided which includes a vehicle roof having an opening formed therein, a sliding roof mounted on the vehicle for opening or closing the opening of the vehicle roof, a rail member provided on opposite side portions of the opening of the vehicle roof, respectively, a first and second shoe slidably engaged with each rail member, respectively a drive cable mechanism operatively connected to the first and second shoes, and a connecting plate for operatively connecting each of the first and second shoes and the sliding roof so as to form a vertical and width directional clearance therebetween.

BRIEF DESCRIPTION OF THE DRAWINGS

Various other features, objects and attendant advantages of the present invention will be more fully appreciated as the same becomes better understood from the following detailed description when considered in connection with the accompanying drawings in which like reference characters designate like or corresponding parts through the several views and wherein:

FIG. 4 is a sectional view taken along the line IV—IV in FIG. 3; and

FIG. 5 is a view of the present invention taken in the V-arrow view in FIG. 4.

DETAILED DESCRIPTION OF THE PREFERRED EMBODIMENT

Figure 1:
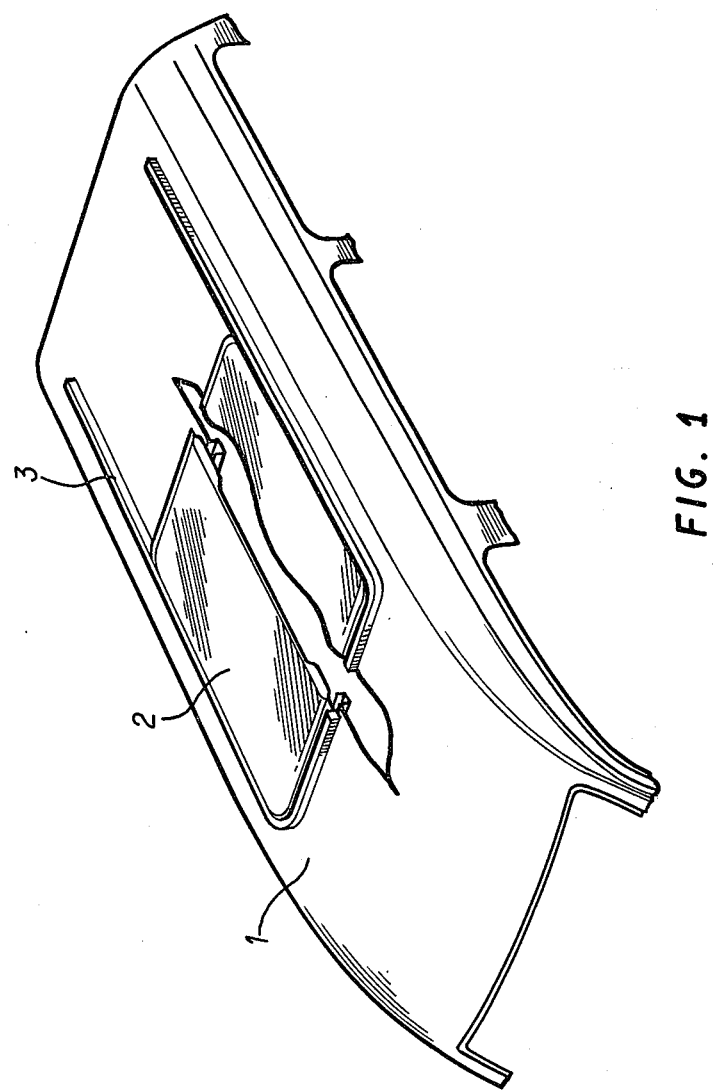
FIG. 1 is a perspective view of a sliding roof for vehicles according to the present invention.
Figure 2:
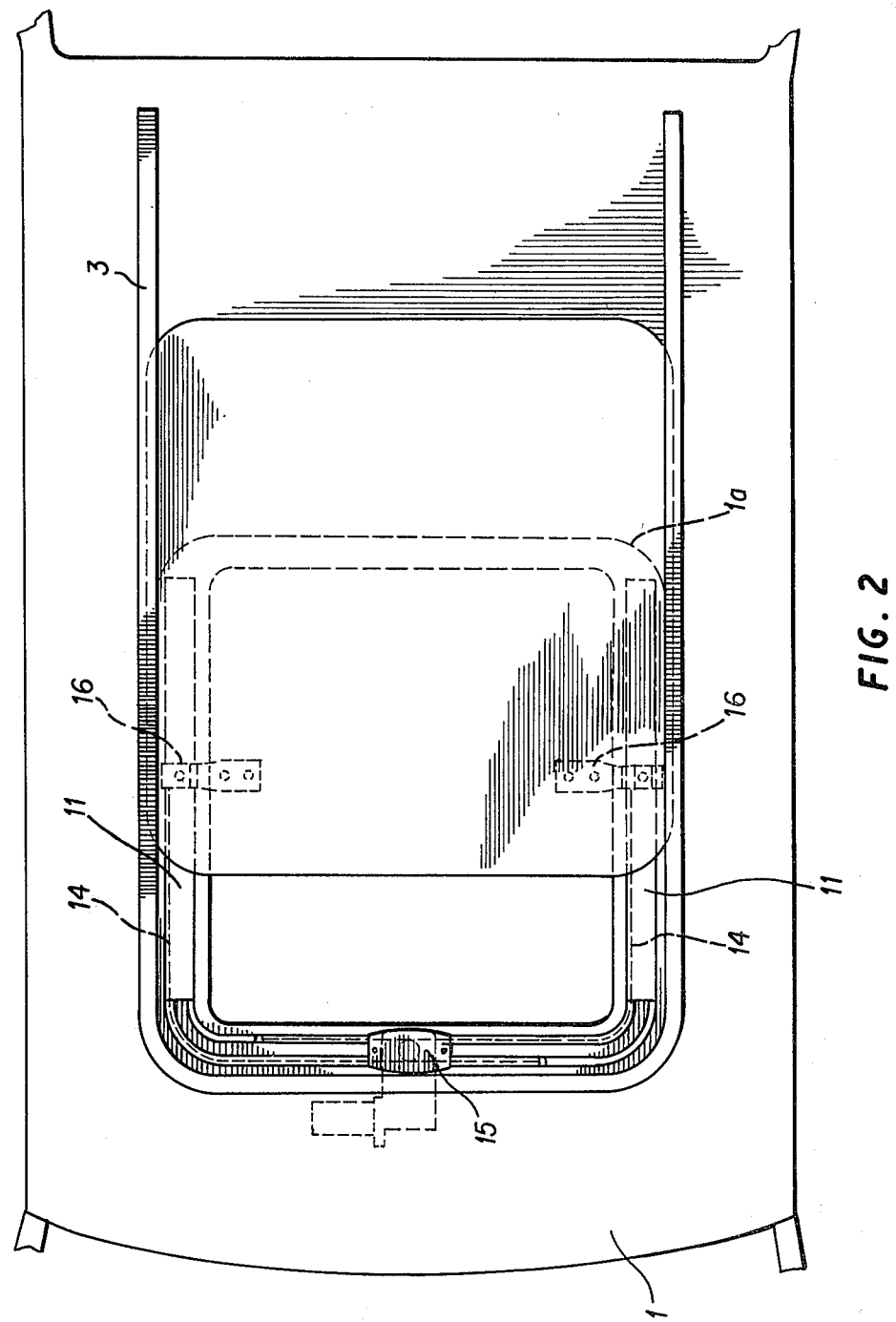
FIG. 2 is a plan view showing a vehicle roof in accordance with the present invention.
Figure 3:
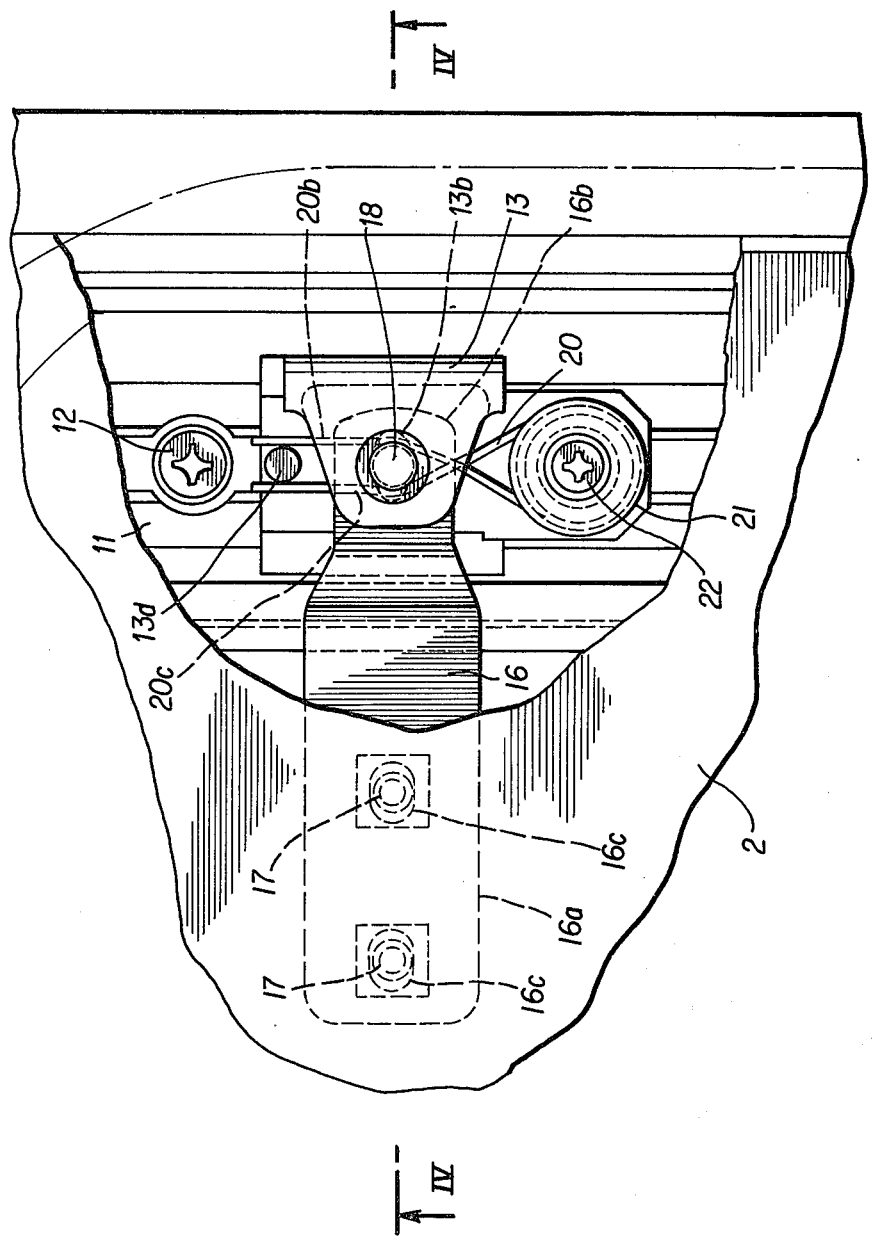
FIG. 3 is an enlarged, partial sectional view of the present invention.

Referring now to FIGS. 1 and 2, reference numeral 1 denotes a vehicle roof which has an opening 1a formed therein. A sliding roof 2 for closing and opening the opening 1a of vehicle roof 1 is slidably supported by an outer rail 3 fixed on an outer surface of vehicle roof 1 in a forward and rearward direction (the lefthand side of FIG. 2 being the forward direction of the vehicle).

Outer rail 3 has a U-shaped section as shown in FIG. 4 and is fixed to vehicle roof 1 by means of a bolt 4. A weather strip 5 is provided within outer rail 3. A protector 6 made of plastic which is slidable within weather strip 5 is mounted on a peripheral edge portion of sliding roof 2.

A housing 7 having a smaller respective opening than opening 1a is provided within the opening 1a as shown in FIGS. 2–5. Housing 7 is fixed to vehicle roof 1 at an outer circumferential edge portion thereof by welding, etc. and a garnish 9 covering an opening edge of housing 7 and an opening edge of a vehicle ceiling 8 is fixed at the opened edge portion of housing 7 by a boss 12. A rail 11 for forward and rearward direction movement thereon is fixedly mounted on the left and right side portions of housing 7 by boss 12.

A first and second shoe 13 (only one shoe being referred to hereinafter so as to avoid duplication) made of plastic which are each slidably engaged with each rail 11 are operatively connected to a drive cable 14 having teeth introduced into a hole portion 11a of rail 11 and is slidable on rail 11 by driving drive cable 14 through a drive mechanism 15 mounted on a front side portion of housing 7.

Shoe 13 and sliding roof 2 are interconnected by a connecting plate 16. Connecting plate 16 is provided with a portion 16a connected to sliding roof 2 by a bolt 17 along an inner face of sliding roof 2 and an end portion 16b connected to shoe 13 by a vertical pin 18 which is inserted into a horizontal slot 13a of shoe 13. Pin 18 is fixedly connected to and movably supported in a width direction on shoe 13 by a washer. Two holes 13b provided in shoe 13 for admitting pin 18 are in the form of elongated slots in order to provide clearance in the width direction of the vehicle. The vertical dimension of horizontal slot 13a of shoe 13 is larger than the thickness of connecting plate 16 in order to provide vertical clearance between shoe 13 and connecting member 16.

In accordance with shoe 13 and connecting plate 16, the diameter of pin 18 is not related to the vertical dimension of the space required for an upper portion of shoe 13. Insofar as it is sufficient to merely provide a vertical clearance required between shoe 13 and end portion 16b of connecting plate 16 (in a conventional embodiment having a horizontal pin, respective vertical clearances between a pin and a connecting member, and the connecting member and a shoe, are necessary so that the vertical clearances are cumulative), the vertical dimension of the space required for the upper portion of the shoe 13 is lessened.

Bolt 17 constitutes a threaded screw connecting with a nut 19 fixed to sliding roof 2 and a hole 16c in the form of an elongated slot is provided on connecting plate 16 so as to pass bolt 17 through the elongated slot for regulating the positioned relationship of shoe 13 and sliding roof 2. It is not preferable that the connection of connecting plate 16 and sliding roof 2 be accomplished in the situation wherein pin 18 is inclined toward one end of elongated hole 13b of shoe 13 when connecting plate 16 is connected to sliding roof 2 by bolt 17. Accordingly a spring 20 is attached to shoe 13 for elastically positioning pin 18 at a center of both ends of elongated hole 13b. Spring 20 is a torsion spring and a coil portion 20a is attached to an outer end of a boss portion 13c of shoe 13 by a washer 21 and a boss 22. Both ends 20b, 20c of spring 20 are extended in the forward and rearward direction within horizontal hole 13a and hold pin 18. Shoe 13 is provided with a projection 13d extending into opposite ends of spring 20.

When pin 18 is moved in the width direction of the vehicle, one of ends 20a, 20b of spring 20 is biased by pin 18 and spring 20 is rotated on the boss portion 13c, the other of ends 20a, 20b is, however, contacted with projection 13d and rotation of spring 20 is blocked, so that spring 20 resists movement. The work necessary for connecting connection plate 16 and sliding roof 2 is reduced by providing spring 20 and movement of sliding roof 2 in the width direction of the vehicle upon running is also blocked by spring 20.

Driving cable 14 is driven by drive mechanism 15 and shoe 13 is forwardly and rearwardly slid in order to open or close opening 1a of vehicle roof 1. The movement of shoe 13 is transmitted to sliding roof 2 through connecting plate 16 and opening 1a is opened or closed by the sliding of sliding roof 2 with the support of outer rail 3.

By the foregoing, there has been disclosed a preferred form of sliding roof for vehicles constructed in accordance with the present invention. It will be appreciated that various additions, substitutions, modifications and omissions may be made thereto without departing from the spirit of the invention.

What is claimed as new and desired to be secured by Letters Patent of the United States is:

1. A sliding rood for vehicles, comprising:
    a vehicle roof having an opening formed therein;
    a sliding roof mounted on said vehicle roof for opening or closing said opening of said vehicle roof;
    a rail member provided on opposite side portions of said opening of said vehicle roof, respectively;
    a first and second shoe slidably engaged with each of said rail members, respectively;
    drive cable means operatively connected to said first and second shoes; and
    connecting plate means for operatively connecting each of said first and second shoes and said sliding roof so as to form a vertical and width directional clearance therebetween wherein said connecting plate means further comprises a connecting plate connected to said roof and a vertical pin interconnecting said connecting plate and each of said first and second shoes, said vertical pin being vertically slidably attached to said connecting plate and being movably supported in a width direction on said first and second shoes.

2. A sliding roof for vehicles as set forth in claim 1 wherein said connecting plate means further comprises a connecting plate connected to said roof and a vertical bolt interconnecting said connecting plate and said sliding roof.

3. A sliding roof for vehicles as set forth in claim 1, wherein each of said first and second shoe members has a horizontal slot formed therein wherein an end portion of said connecting plate is mounted therein.

4. A sliding roof for vehicles as set forth in claim 3, wherein each of said first and second shoe members has a first and second vertically aligned hole formed therein within which said pin is disposed.

5. A sliding roof for vehicles as set forth in claim 4, further comprising means for elastically positioning said pin in said first and second aligned hole.

6. A sliding roof for vehicles as set forth in claim 1, wherein each of said first and second shoe members has a first and second vertically aligned hole formed therein within which said pin is disposed.

7. A sliding roof for vehicles as set forth in claim 6, further comprising spring means for elastically positioning said pin in said first and second aligned hole.

* * * * *